Jan. 27, 1953  J. H. STARR  2,626,547
CULTIVATOR

Filed March 20, 1948  2 SHEETS—SHEET 1

INVENTOR.
JOHN H. STARR
BY
ATTORNEYS

Jan. 27, 1953          J. H. STARR                 2,626,547
                        CULTIVATOR
Filed March 20, 1948                        2 SHEETS—SHEET 2
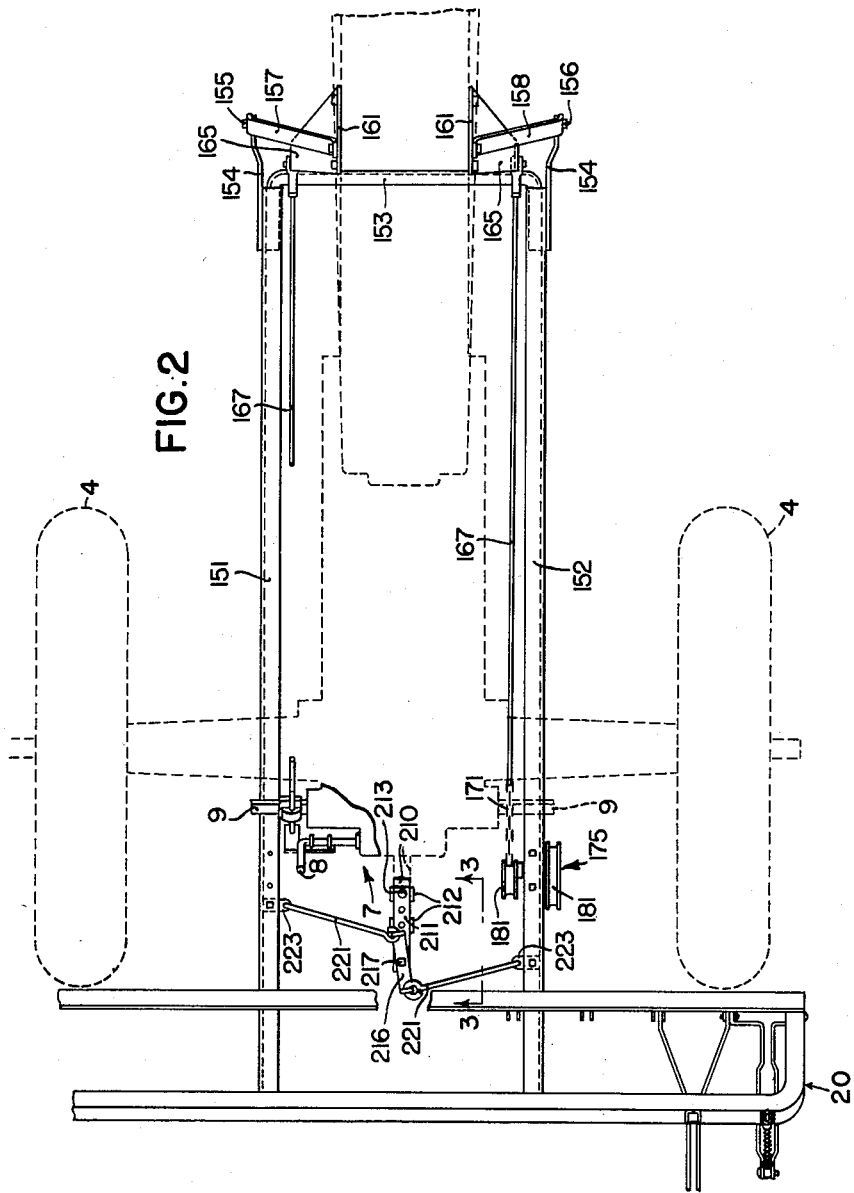
*INVENTOR.*
JOHN H. STARR
BY
ATTORNEYS Patented Jan. 27, 1953

2,626,547

UNITED STATES PATENT OFFICE 2,626,547

CULTIVATOR

John H. Starr, Mayville, Wis., assignor to John Deere Van Brunt Company, Horicon, Wis., a corporation of Wisconsin Application March 20, 1948, Serial No. 16,047

2 Claims. (Cl. 97—47)

The present invention relates generally to agricultural implements and more particularly to implements that are adapted to be mounted on a tractor to be propelled thereby and controlled by the operator on the tractor.

The object and general nature of the present invention is the provision of an integral ground working tool so constructed and arranged as to be held against lateral shifting relative to the tractor but without interfering with its relatively free vertical movement.

These and other objects and advantages of the present invention will be apparent to those skilled in the art after a consideration of the following description, taken in conjunction with the accompanying drawings.

In the drawings:

Figure 2 is a plan view of the implement shown in Figure 1.

Figures 1, 3:
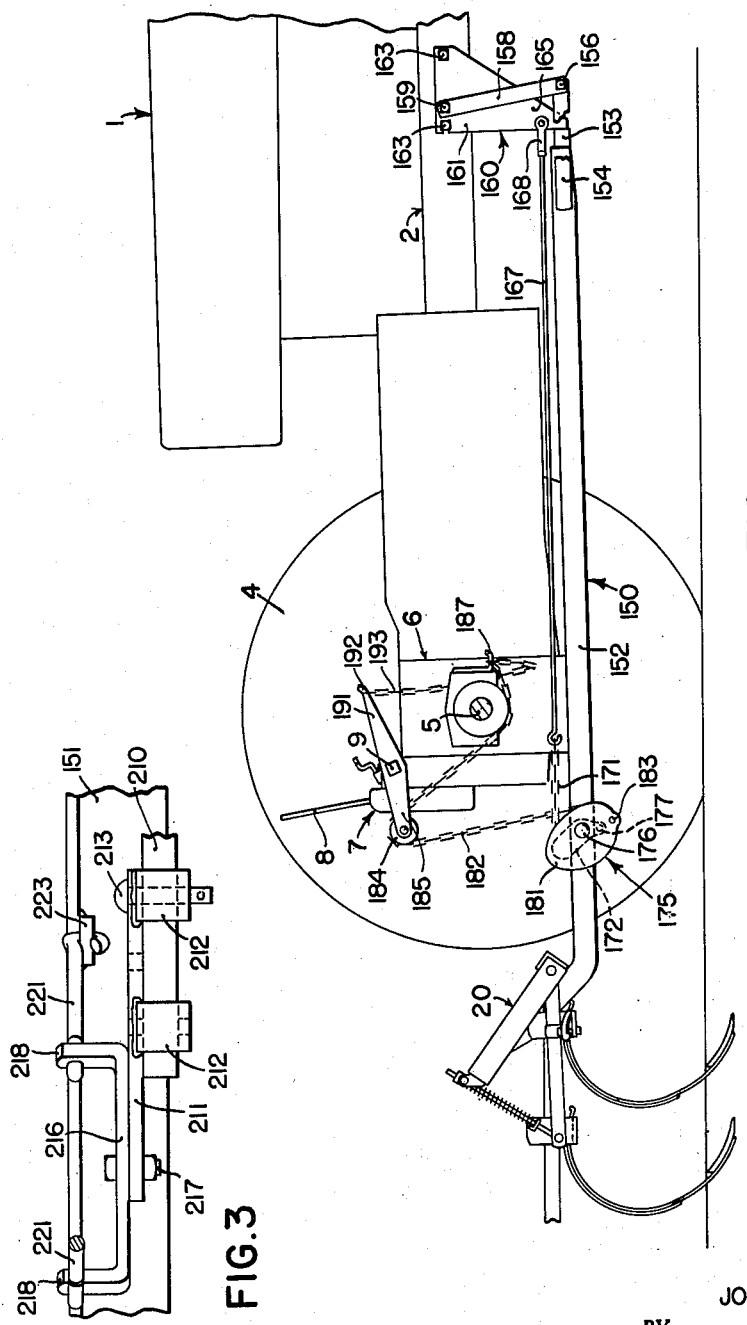
Figure 1 is a side view of the rear portion of a tractor mounted field cultivator in which the principles of the present invention have been incorporated.
Figure 3 is a fragmentary view, taken along the line 3—3 of Figure 2, showing the stabilizing linkage and its quick attachable mounting on the tractor drawbar.

Referring now to the drawings, particularly Figures 1 and 2, the tractor on which the implement of the present invention is mounted is indicated in its entirety by the reference numeral 1 and so far as the present invention is concerned is largely conventional. The tractor 1 is provided with a frame 2 containing or supporting a power plant, such as a gasoline engine, and is carried on front wheels (not shown) and a pair of relatively widely spaced rear traction wheels 4 fixed to axle shafts 5 that are journaled for rotation in a rear axle structure 6. The tractor 1 is also provided with a power lift unit 7 which includes a suitable operating mechanism, including a valve operating lever 8, and a rockshaft 9 on which power lift arms, referred to in detail below, are secured for movement between a lowered position and an upper or raised position.

The implement chosen to illustrate the present invention is shown as a spring tooth field cultivator indicated in its entirety by reference numeral 20. The cultivator 20 incorporates a frame 150 which includes right and left hand generally longitudinally extending frame bars, preferably in the form of angles 151 and 152, the rear ends of which are turned upwardly, forming upwardly and rearwardly angled sections to which the crossbars and other parts of the cultivator 20 are connected. The present invention is not concerned with the particular details of the ground working elements of the cultivator 20, since they are old per se.

In the illustrated form of the present invention, the two angle bars 151 and 152 are connected together at their forward ends by a U-shaped angle bar 153. Also connected to the front ends of the frame bars 151 and 152 is a pair of hitch straps 154. The forward ends of the hitch straps are apertured to receive bolts 155 and 156 by which the frame 150 is connected to a pair of fore and aft swingable hitch links 157 and 158. The upper ends of the links are pivotally connected, as at 159, to a draft bracket structure 160, preferably comprising a pair of vertical plates 161 detachably connected, as by bolts 163, to the side angles of the tractor frame. The draft brackets 161 are disposed laterally outwardly at their lower ends, as indicated at 165, to form convenient connection points by which the front ends of a pair of draft links 167 may be pivotally connected therewith, as by an adjustable swivel 168. By virtue of the forward side of the transverse frame angle 153 contacting the lower portions 165 of the brackets 161, the frame 158 is prevented from swinging forwardly far enough to permit the frame bar 25 to strike the rear tires of the tractor. The frame 150 is free to swing rearwardly.

The rear ends of the draft links 167 are connected to the front ends of chains 171, and the rear end of each of the chains 171 is connected to a cam element 172 which forms a part of a rotatable cam member 175 mounted for rocking, as at 176, on the associated frame bar. The rear end of the chain 171 is connected to the cam element 172 by a pin or the like, as indicated at 177 in Figure 1.

Each of the cam members 175 includes a second cam element 181 to which the lower end of a chain 182 is connected, as at 183. Each of the chains 182 extends upwardly from the cam member 175 over the roller 184 mounted on the rear end of an arm 185 which is fixed to the rear end of the power lift rockshaft 9. The forward end of the chain 182 extends underneath the associated rear axle extension and is adjustably engaged with a hook member 187 that is fixed to the forward side of the axle housing at that side of the tractor. Each of the power lift arms 185 is extended forwardly, as at 191, and is formed with a forward hooked end 192 to which a limit chain 193 is connected, the lower end of the chain 193 being engaged with the hook 187. Preferably, the chain 193 has a sufficient number of additional links so that when engaging any one of a number of links at either end of the chain or the associated hook sections, 187 or 192, the downward movement of the associated power lift arm 185, counterclockwise of that shown in Figure 1, may be limited, as desired.

For stabilizing the cultivator laterally, I have provided a stabilizing mechanism best shown in Figures 2 and 3. Referring now to these figures, the tractor drawbar 210 is utilized as a support for a slide bar 211 which at its forward end carries yokes 212 to embrace the drawbar 210. The member 211 is held in place by a hitch pin 213 or the like. A pivoted equalizing lever 216 is swingably mounted by a pivot bolt 217 on the rear end of the slide bar 211. Opposite end portions of the lever 216 are turned upwardly, as at 218, and apertured to receive the inner ends of a pair of stabilizing rods 221. The inner end of each of the rods 221 is formed with an eye to pivotally interconnect with the upturned portions 218, and the laterally outer ends of the rods 221 are formed with downwardly bent end portions to pivotally connect with apertured clips 223 fixed in any suitable manner to the frame bars 151 and 152.

In operation, when the frame 150 swings upwardly or downwardly relative to the tractor, such movement is accommodated by pivotal movement of the equalizing lever 216, yet the rear end of the implement is prevented from shifting laterally relative to the tractor by the lever 216 and rods 221. When it is desired to disconnect the implement, all that it is necessary to do, other than disconnecting the chains 182 and 193, is to disconnect the brackets 161 and then remove the single pin 213, which permits the bar 211 to slide rearwardly away from the tractor drawbar 210. The engagement of the transverse bar 153 with the lower ends of the brackets 161 serves to prevent the cultivator from swinging forwardly far enough to permit the transverse angles of the cultivator frame to strike the rear tires of the tractor.

In mounting the bell crank or cam members 175, these units may be disposed either with the draft cam element on the outer side of the associated frame bar and the lifting cam element on the inner side, or with the draft cam element on the inside of the associated frame bar and the lifting cam element on the outer side, as shown in Figures 1-3, depending on the distance between the associated draft rods and/or the lifting arms on the tractor power lift unit, or other factor.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A farm machine adapted to be connected with a propelling support, comprising ground working tool means adapted to be connected with said support for both fore and aft and generally vertical movement relative to said support, means for transmitting pulling draft from said propelling support to said tool means and accommodating said fore and aft and vertical movement of said tool means relative to said propelling support, a generally centrally disposed stabilizing lever, means for mounting said lever on said propelling support for rocking movement about a generally vertical axis relative to said support, link means extending from opposite ends of said lever laterally to laterally spaced points on said tool means, and means for connecting the inner and outer ends of said link means with said stabilizing lever and said tool means for both horizontal and vertical swinging movement relative thereto so as to prevent lateral movement of said tool means relative to said support but accommodating the aforesaid fore and aft and vertical movement of the tool means relative to said propelling support.

2. In a tractor propelled agricultural implement adapted to be connected with a tractor having a centrally fixed, rearwardly extending drawbar, said implement including frame means having generally fore and aft laterally spaced frame members, the improvement comprising an equalizing lever, means for mounting said lever at its central portion on said tractor drawbar for swinging movement about a generally vertical axis, a pair of links extending from opposite ends of said equalizing lever to said laterally spaced frame members, respectively, for restraining said implement from moving laterally relative to the tractor, and means for pivotally connecting the inner and outer ends of said links with the ends of said lever and said spaced frame members for both horizontal and vertical swinging movement relative thereto.

JOHN H. STARR.

REFERENCES CITED

The following references are of record in the file of this patent:

UNITED STATES PATENTS

| Number | Name | Date |
|---|---|---|
| 2,115,220 | Stewart et al. | Apr. 26, 1938 |
| 2,140,144 | Silver | Dec. 13, 1938 |
| 2,230,766 | Smith | Feb. 4, 1941 |
| 2,409,510 | Mott | Oct. 15, 1946 |
| 2,462,641 | Hyland | Feb. 22, 1949 |